(12) United States Patent
Lee et al.

(10) Patent No.: US 11,387,474 B2
(45) Date of Patent: Jul. 12, 2022

(54) COOLING CONTROL SYSTEM AND CONTROL METHOD OF FUEL CELL

(71) Applicants: HYUNDAI MOTOR COMPANY, Seoul (KR); KIA MOTORS CORPORATION, Seoul (KR)

(72) Inventors: Hyun Jae Lee, Seoul (KR); Seong Cheol Jeong, Suwon-si (KR); Hyo Seop Kim, Anseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 16/902,469

(22) Filed: Jun. 16, 2020

(65) Prior Publication Data

US 2021/0111423 A1 Apr. 15, 2021

(30) Foreign Application Priority Data

Oct. 11, 2019 (KR) .......................... 10-2019-0126403

(51) Int. Cl.
| | |
|---|---|
| H01M 8/04746 | (2016.01) |
| H01M 8/04858 | (2016.01) |
| H01M 8/04701 | (2016.01) |
| H01M 8/04007 | (2016.01) |

(52) U.S. Cl.
CPC ... H01M 8/04768 (2013.01); H01M 8/04067 (2013.01); H01M 8/0488 (2013.01); H01M 8/04723 (2013.01)

(58) Field of Classification Search
CPC ......... H01M 8/04014; H01M 8/04029; H01M 8/04067; H01M 8/04358; H01M 8/04492; H01M 8/04559; H01M 8/04619; H01M 8/04723; H01M 8/04768; H01M 8/0488; Y02E 60/50

See application file for complete search history.

(56) References Cited

U.S. PATENT DOCUMENTS

2012/0129067 A1* 5/2012 Nam ................. H01M 8/04768
429/437

FOREIGN PATENT DOCUMENTS

| KR | 10-1610392 B1 | 4/2016 |
|---|---|---|
| KR | 10-1628514 B1 | 6/2016 |
| KR | 10-1655579 B1 | 9/2016 |

* cited by examiner

*Primary Examiner* — Victoria H Lynch
(74) *Attorney, Agent, or Firm* — Lempia Summerfield Katz LLC

(57) ABSTRACT

A cooling control system includes: a fuel cell stack formed with a cooling flow path in which hydrogen and oxygen are received and reacted, respectively, and coolant flows between separators; a coolant circulation line connected with the cooling flow path of the fuel cell stack, and having the coolant flowing therein; a cooling pump connected to the coolant circulation line to circulate the coolant to cool the fuel cell stack; a heat generation amount estimator for estimating the heat generation amount of the fuel cell stack; a coolant estimator for estimating an amount of the coolant to cool the fuel cell stack based on the heat generation amount of the fuel cell stack; and a driving controller for controlling the operation of the cooling pump based on the estimated amount of the coolant.

10 Claims, 5 Drawing Sheets

US 11,387,474 B2

COOLING CONTROL SYSTEM AND CONTROL METHOD OF FUEL CELL

CROSS REFERENCE TO RELATED APPLICATION

This application claims priority to and the benefit of Korean Patent Application No. 10-2019-0126403, filed on Oct. 11, 2019, the entire contents of which are incorporated herein by reference.

FIELD

The present disclosure relates to a technology of estimating the heat generation amount of a fuel cell stack, and controlling a cooling pump based on the heat generation amount of the fuel cell stack.

BACKGROUND

The statements in this section merely provide background information related to the present disclosure and may not constitute prior art.

A fuel cell is to convert chemical energy into electrical energy by using the oxidation-reduction reaction of hydrogen and oxygen supplied from a hydrogen supply device and an air supply device, respectively, and includes a fuel cell stack for producing electrical energy, a cooling system for cooling the same, and the like.

That is, hydrogen is supplied to an anode side of the fuel cell stack, and the oxidation reaction of hydrogen is performed at the anode to generate proton and electron, and the proton and electron generated at this time move to a cathode through an electrolyte membrane and a separator, respectively. At the cathode, water is generated through the electrochemical reaction in which proton, electron, and oxygen in the air moving from the anode are involved, and electrical energy is generated from the flow of electron.

The thermal energy together with the electrical energy is generated by the chemical reaction in the fuel cell stack. The fuel cell stack includes a cooling system in order to prevent the fuel cell stack from being overheated and deteriorated by the thermal energy. In particular, a water-cooled cooling system for cooling the fuel cell stack by forming a cooling flow path through which coolant flows between unit cells included in the fuel cell stack is mainly used.

In such a cooling system, since it is difficult to directly measure the temperature of the fuel cell stack, it may be indirectly estimated by using the coolant outlet temperature discharged through the fuel cell stack. Further, cooling the fuel cell stack is controlled by a thermostat to control a ratio between the coolant having passed through a radiator and the coolant having bypassed the radiator according to the estimated temperature of the fuel cell stack or a pump for flowing the coolant.

That is, the fuel cell stack is cooled by mixing the coolant having passed through the radiator flowing into the thermostat and the coolant having bypassed the radiator. However, we have discovered that when low-temperature coolant having passed through the radiator flows into the fuel cell stack, a thermal shock occurs in the fuel cell stack.

Further, we have found that the radiator has not maintained the heat dissipation performance in a state where a relatively small amount of heat is generated in the fuel cell stack and the required amount of heat dissipation is low, and therefore, if the required amount of heat dissipation of the fuel cell stack increase again, the time required for exerting the cooling performance of the cooling system is delayed.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a control system and a control method for controlling a cooling pump based on the heat generation amount of a fuel cell stack and the coolant temperature of the inlet and outlet of a cooling flow path of the fuel cell stack.

In one form of the present disclosure, a cooling control system of a fuel cell includes: a fuel cell stack formed with a cooling flow path in which hydrogen and oxygen are received and reacted, respectively, and coolant flows between separators; a coolant circulation line connected with the cooling flow path of the fuel cell stack, and having the coolant flowing therein; a cooling pump connected to the coolant circulation line and configured to circulate the coolant to cool the fuel cell stack; a heat generation amount estimator configured to estimate the heat generation amount of the fuel cell stack; a coolant estimator configured to estimate an amount of the coolant to cool the fuel cell stack based on the estimated heat generation amount of the fuel cell stack; and a driving controller configured to control the operation of the cooling pump based on the estimated amount of the coolant.

In one form, the cooling control system further includes: a first temperature sensing sensor installed at an inlet of the cooling flow path of the fuel cell stack, and a second temperature sensing sensor installed at an outlet of the cooling flow path of the fuel cell stack.

The heat generation amount estimator may estimate the heat generation amount of the fuel cell stack by using a ratio between a theoretical voltage and an average cell voltage of the fuel cell stack and the output of the fuel cell stack.

The heat generation amount of the fuel cell stack may be estimated by variably applying a value between a low-grade theoretical voltage in a low-grade heat generation amount state and a high-grade theoretical voltage in a high-grade heat generation amount state as the theoretical voltage. The theoretical voltage may be set by the heat generation amount estimator based on the internal humidity of the fuel cell stack, the theoretical voltage may be set by the heat generation amount estimator based on a coolant average temperature and an output value of the fuel cell stack, and the theoretical voltage may be set by a discharge cycle of condensate collected in a water trap.

The coolant estimator estimates the amount of coolant to cool the fuel cell stack based on a heat generation amount calculated by subtracting an air cooling amount by air from the estimated heat generation amount of the fuel cell stack, and the driving controller controls the operation of the cooling pump based on the estimated amount of coolant to cool the fuel cell stack.

The driving controller may estimate a coolant required flow rate based on the amount of coolant, a coolant specific heat and a target value of a coolant temperature difference between the inlet and outlet of the cooling flow path.

The driving controller may control the cooling pump with a pre-mapped revolutions per minute (RPM) determined based on the coolant required flow rate. The pre-mapped RPM may be pre-mapped based on the coolant required flow rate, an average temperature of the coolant, and opening of a bypass valve of the coolant circulation line.

The driving controller may set a target value to the coolant temperature difference between the inlet and outlet of the cooling flow path, and increase the RPM of the cooling pump when the coolant temperature difference is larger than the set target value. The target value of the coolant temperature difference may be pre-mapped based on the coolant temperature at the outlet of the cooling flow path and the heat generation amount of the fuel cell stack.

In another form of the present disclosure, a cooling control method of a fuel cell includes: measuring a coolant temperature at an inlet and an outlet of a cooling flow path through a first temperature sensing sensor installed at the inlet of the cooling flow path of a fuel cell stack and a second temperature sensing sensor installed at the outlet of the cooling flow path of the fuel cell stack; estimating, by a heat generation amount estimator, a heat generation amount of the fuel cell stack; estimating, by a coolant estimator, an amount of coolant to cool the fuel cell stack based on the estimated heat generation amount of the fuel cell stack; and controlling, by a driving controller, the operation of a cooling pump based on the estimated amount of the coolant ant.

The estimating the heat generation amount may include: estimating the heat generation amount of the fuel cell stack based on a ratio between a theoretical voltage and an average cell voltage of the fuel cell stack and an output of the fuel cell stack. The heat generation amount of the fuel cell stack may be estimated by variably applying a value between a low-grade theoretical voltage in a low-grade heat generation amount state and a high-grade theoretical voltage in a high-grade heat generation amount state as the theoretical voltage.

The estimating the amount of coolant to cool the fuel cell stack may include: subtracting an air cooling amount by the air from the estimated heat generation amount of the fuel cell stack.

The controlling the operation of the cooling pump may include: estimating a coolant required flow rate by dividing the estimated amount of coolant by a coolant specific heat of the coolant and a coolant temperature difference between the inlet and outlet of the cooling flow path.

The controlling the operation of the cooling pump may include: setting a target value to a coolant temperature difference between the inlet and outlet of the cooling flow path, and increasing the RPM of the cooling pump when the coolant temperature difference is larger than the set target value.

As described above with exemplary forms of the present disclosure, it is possible to improve the control of the cooling pump based on the heat generation amount of the fuel cell stack, thereby reducing or minimizing the exposure of the temporary dry and high temperature thermal shock state.

It is possible to control the cooling pump based on the heat generation amount of the fuel cell stack, thereby improving the cooling responsiveness and improving durability.

It is possible to lower the RPM of the cooling pump to an appropriate level compared to the conventional one when switching from the sudden output state to the FC STOP mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
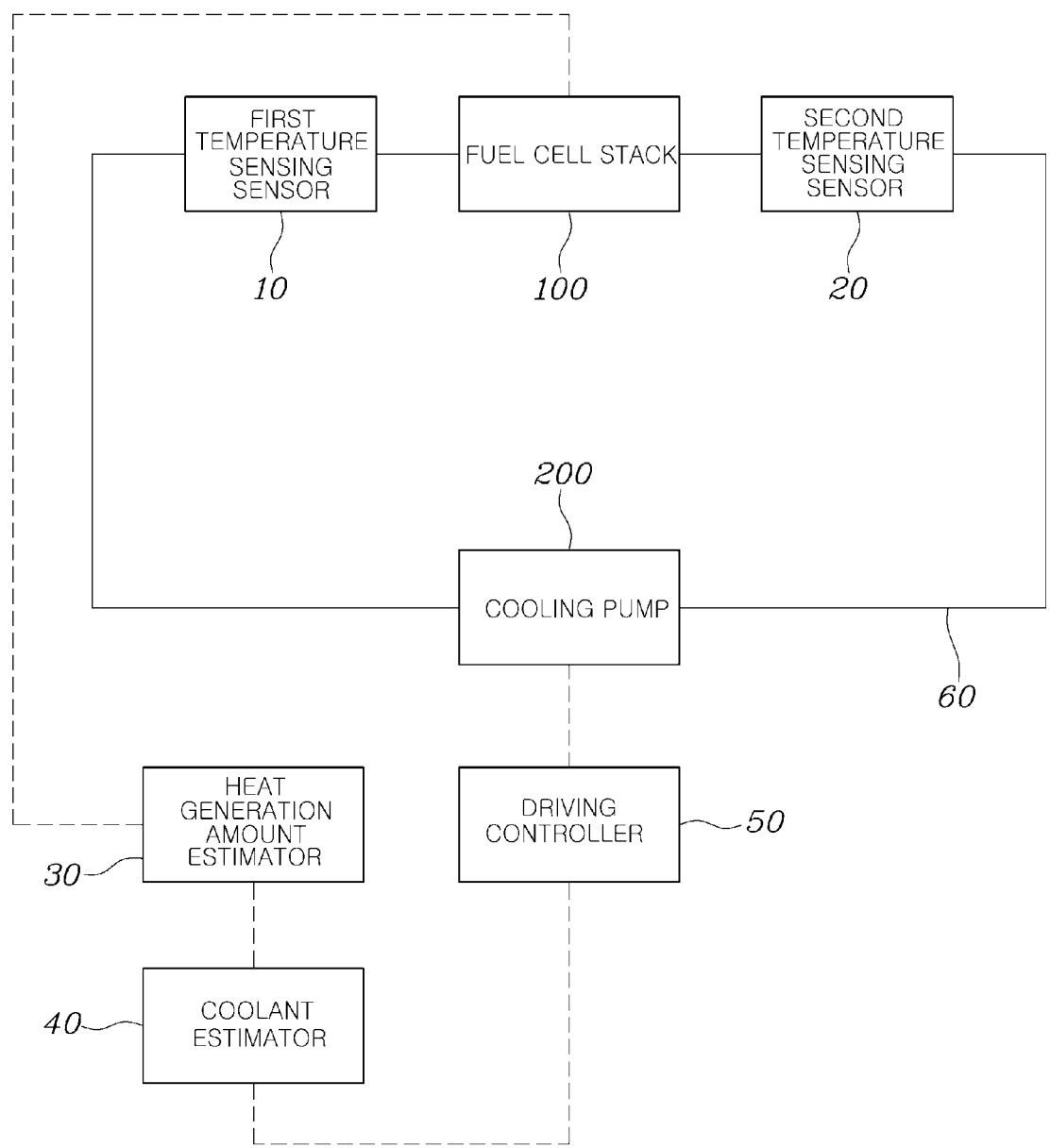
FIG. 1 is a block diagram of a cooling control system of a fuel cell according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions of the forms of the present disclosure disclosed in the specification or application are only for the purpose of illustrating the forms of the present disclosure, and the forms in accordance with the present disclosure may be embodied in various forms and should not be construed as limited to the forms set forth in the specification or application.

Various modifications and various forms may be made in the forms according to the present disclosure, so that specific forms are illustrated in the drawings and described in detail in the specification or application. It should be understood, however, that it is not intended to limit the forms in accordance with the concepts of the present disclosure to the particular disclosed forms, but includes all modifications, equivalents, and alternatives falling within the sprit and technical scope of the present disclosure.

The terms "first" and/or "second," and the like may be used to illustrate various components, but the components should not be limited by the tams. The terms are used to differentiate one element from another, for example, a first component may be referred to as a second component, and similarly, the second component may be also referred to as the first component without departing from claims in accordance with the concepts of the present disclosure.

It will be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

The terminology used in the specification is for the purpose of describing particular forms only and is not intended to limit the present disclosure. The singular forms are intended to include the plural forms as well, unless the context clearly indicates otherwise. In the specification, it will be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Hereinafter, the present disclosure will be described in detail by describing exemplary foams of the present disclosure with reference to the accompanying drawings. The same reference numerals indicated in each drawing denote the same members.

A heat generation amount estimator, a coolant estimator, and a driving controller according to an exemplary form of the present disclosure may be implemented through a non-volatile memory (not illustrated) configured to store data relating to an algorithm configured to control the operation of various components of the vehicle or software instructions for reproducing the algorithm and a processor (not illustrated) configured to performing the operation described below by using the data stored in the corresponding memory. Here, the memory and the processor may be implemented as separate chips. Alternatively, the memory and the processor may be implemented as a single chip integrated with each other. The processor may take the form of one or more processors.

Figure 2:
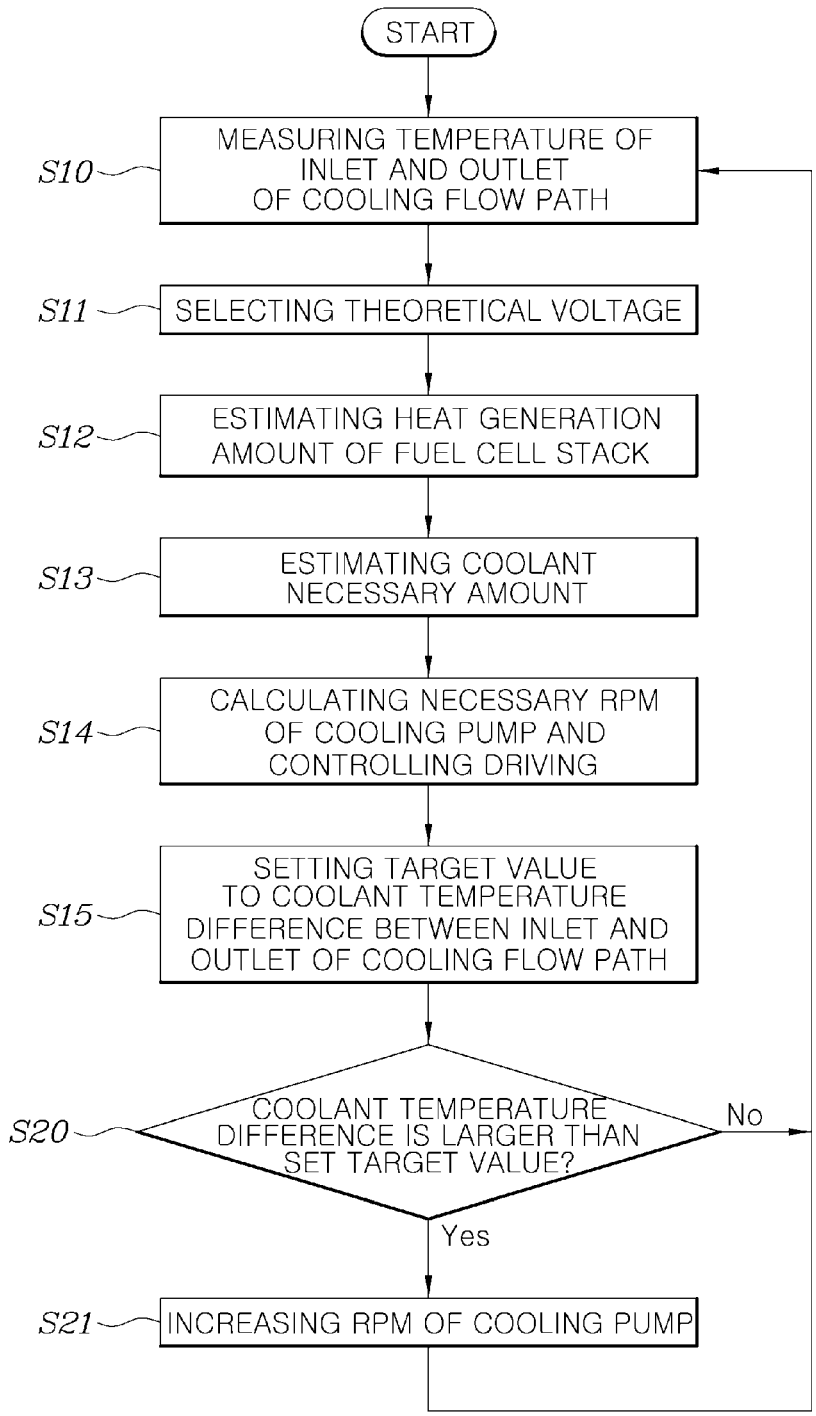
FIG. 2 is a flowchart illustrating a cooling control method of the fuel cell according to another form of the present disclosure.
Figure 3:
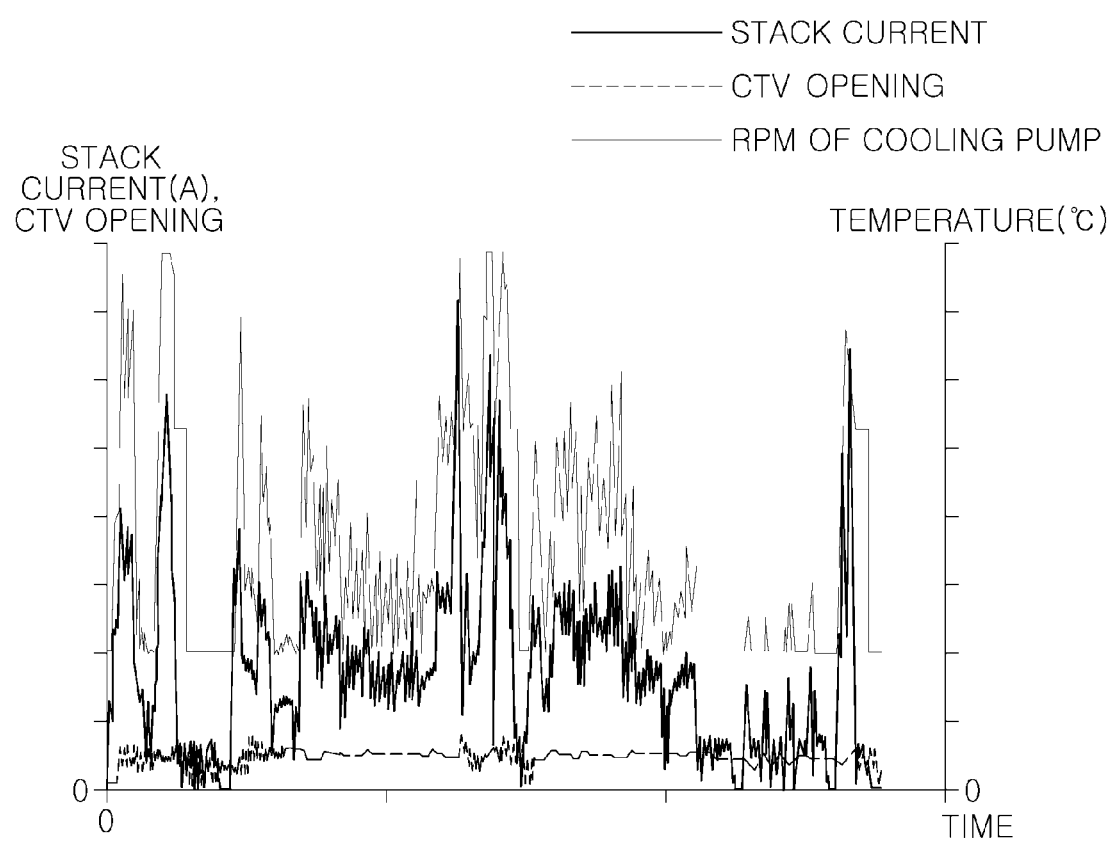
FIG. 3 is a graph illustrating the current of a fuel cell stack, the opening of a bypass valve of a coolant circulation line, and the RPM of a cooling pump according to a cooling control of the fuel cell according to one form of the present disclosure.
Figure 4:
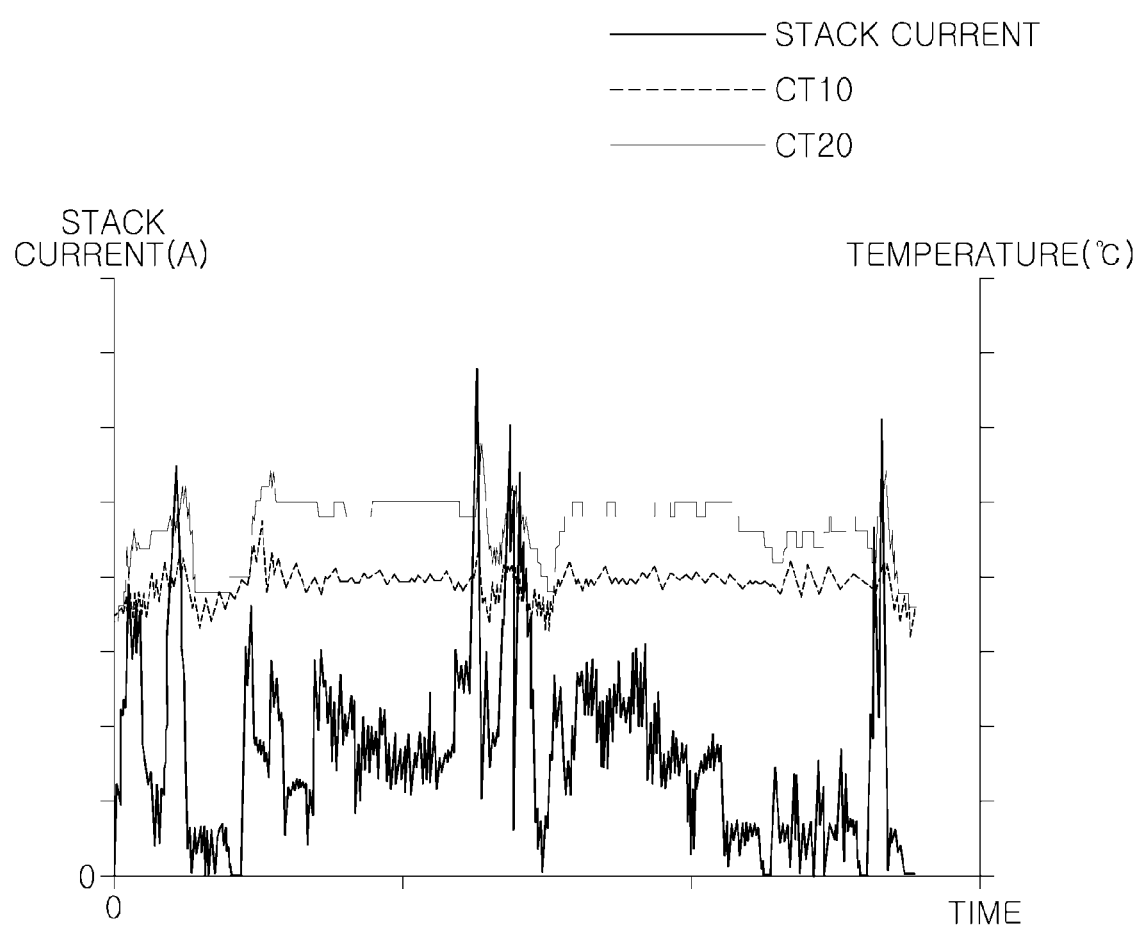
FIG. 4 is a graph illustrating the current of the fuel cell stack and the temperature of the inlet and outlet of a cooling flow path according to a cooling control of the fuel cell according to one form of the present disclosure.
Figure 5:
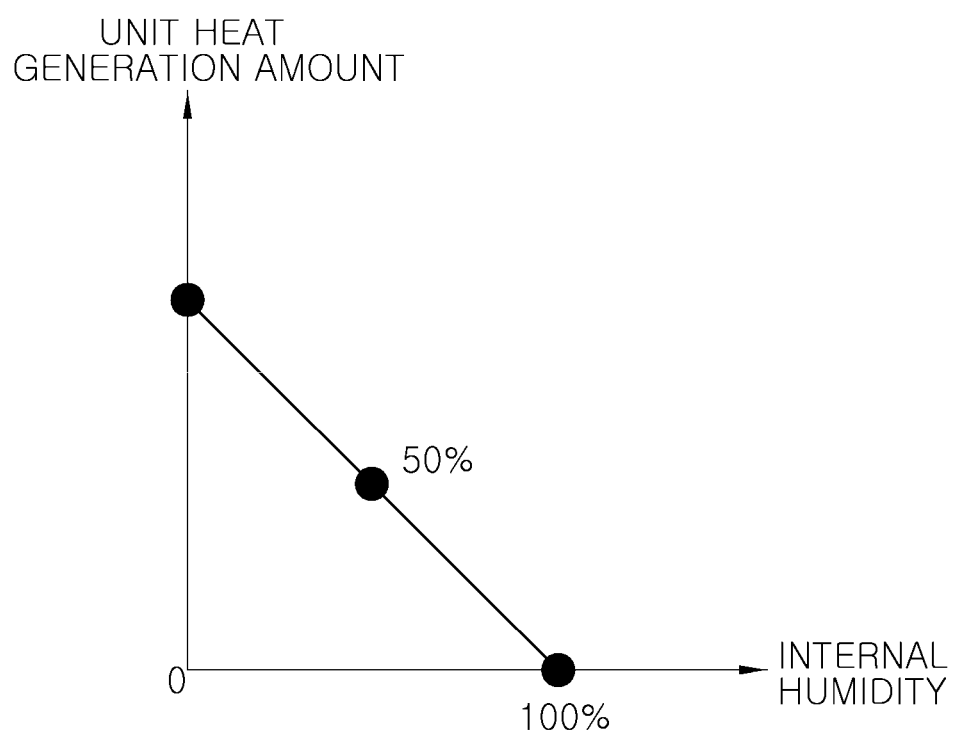
FIG. 5 is a graph illustrating a change in the unit heat generation amount according to humidity according to one form of the present disclosure.

FIG. 1 is a block diagram of a cooling control system of a fuel cell according to one form of the present disclosure, FIG. 2 is a flowchart of a cooling control method of the fuel cell according to another form of the present disclosure, and FIG. 3 is a graph of the current of a fuel cell stack, the opening of a bypass valve of a coolant circulation line, and the RPM of a cooling pump 200 according to a cooling control of the fuel cell according to one form of the present disclosure. The CTV of the graph means the bypass valve of the coolant circulation line. FIG. 4 is a graph of the current of the fuel cell stack and the temperature of the inlet and outlet of a cooling flow path according to a cooling control of the fuel cell according to one form of the present disclosure. The CT10 refers to the temperature measured by a first temperature sensing sensor and the CT20 refers to the temperature measured by a second temperature sensing sensor. FIG. 5 is a graph illustrating a change in the unit heat generation amount according to humidity.

Referring to FIGS. 1 to 5, a fuel cell cooling control system according to the present disclosure includes a fuel cell stack 100 formed with a cooling flow path in which hydrogen and oxygen are received and reacted, respectively, and coolant flows between separators; a coolant circulation line 60 connected with the cooling flow path of the fuel cell stack 100, and having the coolant flowing therein; a cooling pump 200 connected to the coolant circulation line 60 to circulate the coolant to cool the fuel cell stack 100; a heat generation amount estimator 30 for estimating the heat generation amount of the fuel cell stack 100; a coolant estimator 40 for estimating the coolant necessary amount based on the heat generation amount of the fuel cell stack 100 estimated by the heat generation amount estimator 30; and a driving controller 50 for controlling the driving of the cooling pump 200 based on the coolant necessary amount estimated by the coolant estimator 40.

The fuel cell cooling control system according to the present disclosure further includes a first temperature sensing sensor 10 installed at the inlet of the cooling flow path of the fuel cell stack 100 and a second temperature sensing sensor 20 installed at the outlet of the cooling flow path of the fuel cell stack 100.

The fuel cell stack 100, the first temperature sensing sensor 10, the second temperature sensing sensor 20, and the cooling pump 200 are connected by the coolant circulation line 60, and the fuel cell stack 100, the heat generation amount estimator 30, the coolant estimator 40, the driving controller 50, and the cooling pump 200 are connected by a control line. The driving controller 50 may control the RPM of the cooling pump 200.

The heat generation amount estimator 30 may estimate the heat generation amount of the fuel cell stack 100 by using the ratio between a theoretical voltage and an average cell voltage of the fuel cell stack 100 and the output of the fuel cell stack 100.

The theoretical voltage is the voltage of the fuel cell stack 100 estimated by the heat generation amount estimator 30, and the heat generation amount of the fuel cell stack may be estimated by calculating ((theoretical voltage/cell average voltage)−1)*output/1000.

The theoretical voltage may vary according to various factors, and the heat generation amount of the fuel cell stack 100 may be estimated by variably applying a value between the low-grade theoretical voltage in the low-grade heat generation amount state and the high-grade theoretical voltage in the high-grade heat generation amount state. In general, the theoretical voltage is determined between the low-grade theoretical voltage and the high-grade theoretical voltage according to whether generated water condensates or whether latent heat is included.

Further referring to FIG. 5, the theoretical voltage may be set by the internal humidity of the fuel cell stack 100. When the relative humidity according to the internal humidity is 0%, the theoretical voltage is applied as the high-grade theoretical voltage and when the relative humidity is 100%, it is applied as the low-grade theoretical voltage. A median value may be applied by performing the linearization. The relative humidity value is determined according to a real-time relative humidity sensor value or a relative humidity estimated value according to the pre-mapped map.

Further, the theoretical voltage may be set by the coolant average temperature and the output value. The low-grade theoretical voltage is set as an initial value, and the theoretical voltage may be obtained through the pre-mapped map based on the coolant average temperature and the output of the fuel cell stack 100.

Further, the theoretical voltage may be set by the discharge cycle of the condensate collected in a water trap. For example, after the operating temperature is set to 75 degrees Celsius and the condensate discharge cycle at the city running average output is set to a reference cycle, the voltage of the reference cycle may be set to the low-grade theoretical voltage, the maximum value may be set to the high-grade theoretical voltage, and the theoretical voltage may be applied by performing the linearization according to the increase and decrease in the condensate discharge cycle.

The coolant estimator 40 estimates the required cooling amount according to the heat generation amount of the fuel cell stack 100 by subtracting the air cooling amount by the air from the estimated heat generation amount of the fuel cell stack 100, and the driving controller 50 controls the driving of the cooling pump 200 based on the estimated required cooling amount.

Since the necessary cooling amount is the sum of the required cooling amount and the air cooling amount, and the heat generation amount of the fuel cell stack 100 is the necessary cooling amount, the required cooling amount is a value obtained by subtracting the air cooling amount from the heat generation amount of the fuel cell stack 100.

The air cooling amount may be formulated or treated as a constant. For example, when the air cooling amount is treated as a constant, it may be estimated to be less than 2 to 3 kW.

The driving controller 50 may estimate the coolant required flow rate by calculating the required cooling amount estimated by the coolant estimator 40 with the specific heat of coolant and a target value of the coolant temperature difference between the inlet and outlet of the cooling flow path.

The specific heat is a value obtained by multiplying the average value of the temperature of the coolant at the outlet and inlet of the cooling flow path sensed by the temperature sensing sensor by 0.0052 and 2.872.

The cooling pump 200 may be controlled at a pre-mapped RPM according to the coolant required flow rate. The pre-mapped RPM may be pre-mapped according to the coolant required flow rate, the average temperature of the coolant, and the opening of the bypass valve of the coolant circulation line.

For example, the RPM value of the cooling pump 200 may be calculated by C0+C1*the opening of the bypass valve of the coolant circulation line−C2*the average temperature of the coolant+C3*the coolant required flow rate, and the C0 to C3 may be set to a constant.

It is possible to improve the control of the cooling pump 200 based on the heat generation amount of the fuel cell stack 100 to reduce or minimize the exposure of the temporary dry and high temperature thermal shock state, thereby improving the cooling responsiveness and improving the durability.

Further referring to FIG. 3, the change amount of the RPM of the cooling pump 200 may be determined according to the current of the fuel cell stack and the opening value of the bypass valve of the coolant circulation line.

The driving controller 50 may set a target value to the coolant temperature difference between the inlet and outlet of the cooling flow path, and increase the RPM of the cooling pump 200 if the coolant temperature difference is larger than the set target value. The target value of the coolant temperature difference may be pre-mapped according to the coolant temperature of the outlet of the cooling flow path and the heat generation amount of the fuel cell stack 100.

The pre-mapped target value of the coolant temperature difference is decreased as the coolant temperature of the outlet of the cooling flow path increases or the heat generation amount of the fuel cell stack 100 increases. The target value of the coolant temperature difference is pre-mapped to decrease as the heat generation amount of the fuel cell stack 100 increases when the coolant temperature of the outlet of the cooling flow path is constant. Further, the target value of the coolant temperature difference is pre-mapped to decrease as the coolant temperature of the outlet of the cooling flow path increases when the heat generation amount of the fuel cell stack 100 is constant. If the coolant temperature of the outlet of the cooling flow path and the heat generation amount of the fuel cell stack 100 increase at the same time, the target value of the coolant temperature difference is pre-mapped to decrease.

For example, in the city running section or the heating section of the fuel cell stack 100, the necessary coolant amount is relatively decreased and the RPM of the cooling pump 200 is lowered by applying the target value of the coolant temperature difference upward, and in the high output continuous section or the high temperature running section, the necessary coolant amount is relatively increased and the RPM of the cooling pump 200 is increased by applying the target value of the coolant temperature difference downward.

Further referring to FIG. 4, a change between the current of the fuel cell stack 100 and the coolant temperature of the inlet and outlet of the cooling flow path may be confirmed.

Further referring to FIG. 2, a fuel cell cooling control method according to the present disclosure includes measuring the coolant temperature of the inlet and outlet of the cooling flow path through the first temperature sensing sensor 10 installed at the inlet of the cooling flow path of the fuel cell stack 100 and the second temperature sensing sensor 20 installed at the outlet of the cooling flow path of the fuel cell stack 100 (operation S10); estimating the heat generation amount of the fuel cell stack 100 (operation S12); estimating the necessary amount of coolant based on the heat generation amount of the fuel cell stack 100 estimated in the estimating of the heat generation amount (operation S12) (operation S13); and controlling the driving of the cooling pump 200 based on the necessary amount of coolant estimated in the estimating of the coolant (operation S14).

The estimating of the heat generation amount (operation S12) may estimate the heat generation amount of the fuel cell stack 100 by using the ratio between the theoretical voltage and the average cell voltage of the fuel cell stack 100 and the output of the fuel cell stack 100. The heat generation amount of the fuel cell stack 100 may be estimated by variably applying a value between the low-grade theoretical voltage in the low-grade heat generation amount state and the high-grade theoretical voltage in the high-grade heat generation amount state as the theoretical voltage.

The estimating of the coolant (operation S13) may estimate the required cooling amount according to the heat generation amount of the fuel cell stack 100 by subtracting the air cooling amount by the air from the estimated heat generation amount of the fuel cell stack 100, and the controlling of the driving (operation S14) may control the driving of the cooling pump 200 based on the estimated required cooling amount.

The controlling of the driving (operation S14) may estimate the coolant required flow rate by dividing the required cooling amount estimated in the estimating of the coolant (operation S13) by the specific heat of the coolant and the coolant temperature difference between the inlet and outlet of the cooling flow path. The controlling of the driving (operation S14) may control the cooling pump 200 by the pre-mapped RPM according to the coolant required flow rate.

The controlling of the driving (operation S14) may set the target value to the coolant temperature difference between the inlet and outlet of the cooling flow path (operation S15), and may increase the RPM of the cooling pump 200 if the coolant temperature difference is larger than the set target value (operation S20) (operation S21). The target value of the coolant temperature difference may be pre-mapped according to the coolant temperature of the outlet of the cooling flow path and the heat generation amount of the fuel cell stack 100.

While it has been illustrated and described with respect to the specific forms of the present disclosure, it will be understood by those skilled in the art that various improvements and changes of the present disclosure may be made within the technical spirit of the present disclosure.

What is claimed is:

1. A cooling control system of a fuel cell, comprising:
    a fuel cell stack formed with a cooling flow path in which hydrogen and oxygen are received and reacted, respectively, and coolant flows between separators;
    a coolant circulation line connected with the cooling flow path of the fuel cell stack, and having the coolant flowing therein;
    a cooling pump connected to the coolant circulation line and configured to circulate the coolant to cool the fuel cell stack;
    a heat generation amount estimator configured to estimate a heat generation amount of the fuel cell stack;
    a coolant estimator configured to estimate an amount of coolant to cool the fuel cell stack based on the estimated heat generation amount of the fuel cell stack; and
    a driving controller configured to control an operation of the cooling pump based on the estimated amount of the coolant,
    wherein the heat generation amount estimator is configured to estimate the heat generation amount of the fuel cell stack based on a ratio between a theoretical voltage and an average cell voltage of the fuel cell stack, and an output of the fuel cell stack.

2. The cooling control system of claim 1, further comprising:
    a first temperature sensing sensor installed at an inlet of the cooling flow path of the fuel cell stack; and
    a second temperature sensing sensor installed at an outlet of the cooling flow path of the fuel cell stack.

3. The cooling control system of claim 1,
    wherein the heat generation amount of the fuel cell stack is estimated by variably applying a value between a low-grade theoretical voltage in a low-grade heat generation amount state and a high-grade theoretical voltage in a high-grade heat generation amount state as the theoretical voltage.

4. The cooling control system of claim 3,
    wherein the theoretical voltage is set by the heat generation amount estimator based on an internal humidity of the fuel cell stack.

5. The cooling control system of claim 3,
    wherein the theoretical voltage is set by the heat generation amount estimator based on a coolant average temperature and an output value of the fuel cell stack.

6. The cooling control system of claim 3,
    wherein the theoretical voltage is set by the heat generation amount estimator based on a discharge cycle of condensate collected in a water trap.

7. The cooling control system of claim 1,
    wherein the coolant estimator is configured to estimate the amount of coolant to cool the fuel cell stack based on a heat generation amount calculated by subtracting an air cooling amount by air from the estimated heat generation amount of the fuel cell stack, and
    wherein the driving controller is configured to control the operation of the cooling pump based on the estimated amount of coolant to cool the fuel cell stack.

8. The cooling control system of claim 7,
    wherein the driving controller is configured to estimate a coolant required flow rate based on the amount of the coolant estimated by the coolant estimator, a coolant specific heat, and a target value of a coolant temperature difference between an inlet and an outlet of the cooling flow path.

9. The cooling control system of claim 8,
    wherein the driving controller is configured to control the cooling pump with a pre-mapped revolutions per minute (RPM) determined based on the coolant required flow rate.

10. The cooling control system of claim 9,
    wherein the pre-mapped RPM is pre-mapped based on the coolant required flow rate, an average temperature of the coolant, and opening of a bypass valve of the coolant circulation line.

* * * * *